(12) United States Patent
Zhu

(10) Patent No.: US 7,082,816 B2
(45) Date of Patent: Aug. 1, 2006

(54) PREDICTION AND CONTROL OF MASS UNBALANCE AND HIGH SPEED UNIFORMITY

(75) Inventor: Fang Zhu, Greer, SC (US)

(73) Assignee: Michelin Recherche et Technique S.A. (CH)

( * ) Notice: Subject to any disclaimer, the term of this patent is extended or adjusted under 35 U.S.C. 154(b) by 171 days.

(21) Appl. No.: 10/689,147

(22) Filed: Oct. 20, 2003

(65) Prior Publication Data

(51) Int. Cl.
G01M 17/02 (2006.01)
(52) U.S. Cl. ....................................................... 73/146
(58) Field of Classification Search .................. 73/146, 73/146.2, 146.3, 146.5, 146.8
See application file for complete search history.

(56) References Cited

U.S. PATENT DOCUMENTS

| 4,815,004 | A | 3/1989 | Beebe |
| 5,245,867 | A | 9/1993 | Sube et al. |
| 5,396,438 | A | 3/1995 | Oblizajek |
| 5,645,465 | A | 7/1997 | Vannan, III |
| 6,065,331 | A | 5/2000 | Fukasawa |
| 6,086,452 | A | 7/2000 | Lipczynski et al. |
| 6,139,401 | A | 10/2000 | Dunn et al. |
| 6,513,372 | B1* | 2/2003 | Anno et al. ............... 73/146 |
| 6,514,441 | B1 | 2/2003 | Tanaka et al. |
| 6,606,902 | B1 | 8/2003 | Koeune et al. |
| 2002/0177959 | A1 | 11/2002 | Williams et al. |

(Continued)

FOREIGN PATENT DOCUMENTS

WO   WO 2002 099377   6/2001

OTHER PUBLICATIONS

The Tire Society, *Tire Science And Technology*, vol. 19, No. 3, Jul.-Sep. 1991, ISSN 0090-8657, 19 (3) 121-176 (1991) The Tire Society, Inc. Akron, OH 44301 USA.

(Continued)

*Primary Examiner*—Edward Lefkowitz
*Assistant Examiner*—Andre Allen
(74) *Attorney, Agent, or Firm*—Dority & Manning, P.A.

(57) ABSTRACT

Technology is disclosed for characterizing both mass uneven distribution and high speed uniformity of a tire. Mass uneven distribution is identified from analysis of at least two radial run out (RRO) measurements, wherein a first RRO measurement is obtained for a relatively high speed of at least about 600 rotations per minute. A second RRO measurement may be at a relatively low speed less of at most about 180 rotations per minute if the effects of radial stiffness variation on the RRO is mall. If the effects of radial stiffness variation on the RRO can not be neglected, a third RRO at another high speed of at least above 600 rotations per minute is needed. RRO measurements are then decomposed into a plurality of harmonics and mass uneven distribution coefficients are calculated for the respective harmonics. The mass uneven distribution coefficients are then used to determine size and location of any mass unbalance, including mass uneven distribution and/or point mass. Mass unbalance characterization can be further applied to tire sorting processes and improvements to tire manufacturing. Measurement and analysis of tire high speed radial run out can also be coupled with low speed force measurements to determine and characterize tire high speed uniformity. Tire high speed uniformity characterization can also be applied to tire sorting processes and corresponding tire manufacturing process improvement, for example, in control and optimization of tire layer overlap or variation parameters.

36 Claims, 11 Drawing Sheets

U.S. PATENT DOCUMENTS

2002/0177964 A1 11/2002 Shteinhauz
2003/0149542 A1 8/2003 Chang
2004/0020583 A1 2/2004 Zhu et al.

OTHER PUBLICATIONS

PCT Int. Publ. WO 02/099377 (Cheng).

* cited by examiner

PREDICTION AND CONTROL OF MASS UNBALANCE AND HIGH SPEED UNIFORMITY

FIELD OF THE INVENTION

The present invention generally concerns technology for characterizing tire performance parameters, such as mass unbalance including mass uneven distribution, and high speed uniformity. Characterization and prediction of such tire parameters and others may subsequently be used to sort manufactured products and/or control manufacturing aspects thereof.

BACKGROUND OF THE INVENTION

Many vehicle vibrations typically become detectable to a driver at typical highway road speeds in excess of 25 mph. One exemplary cause of vehicle vibration at relatively high speeds corresponds to force variations at respective tire spindle locations which is typically referred to as tire high speed uniformity.

High speed uniformity (HSU) has become a growing concern in the automobile industry, and thus many tire manufacturers are being pressured to implement HSU control. Tire HSU measurement, however, has been difficult and quite costly, making HSU industrial control very difficult.

A multitude of various tire parameters have conventionally been identified and measured in an effort to predict and control these force variations and any resultant undesirable levels of vibration. It is desired to combine multiple tire parameter measurements to predict or determine tire high speed uniformity.

One known attempt at predicting tire HSU is disclosed in U.S. Pat. No. 5,396,438 (Oblizajek), which predicts HSU based on multiple low speed parameters such as radial run out (RRO), instantaneous rolling radius (IRR), and radial force variation (RFV) as obtained on low speed uniformity machines. Yet another example related to aspects of high speed uniformity is found in U.S. Pat. No. 6,065,331 (Fukasawa), which predicts higher order components of high speed uniformity based on low speed uniformity measurements. Low speed uniformity machines are well established and exist in all tire production lines. The above-referenced patents are incorporated herein by reference for all purposes. In light of these previous attempts to predict HSU parameters and the current marketplace focus on controlling HSU levels, it is desired to provide improved technology for characterizing tire HSU.

There are many contributing factors to tire HSU, and thus one of the biggest challenges in effectively controlling HSU lies in being able to properly identify such contributing factors in order to control corresponding levels of tire force variation and vehicle vibration. It has been determined in accordance with the present subject matter that mass uneven distribution generates a significant amount of high speed radial run out, which directly affects high speed uniformity. The previous attempts at predicting tire HSU parameters referenced above do not account for mass uneven distribution as a factor in predicting and controlling high speed uniformity. As such, it is desired in accordance with the presently disclosed technology to provide features for identifying mass uneven distribution at multiple harmonic levels.

Although known technology for characterizing tire high speed uniformity and affecting associated aspects of tire manufacturing have been respectively developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved technology is presented for characterizing both mass uneven distribution and high speed uniformity of a tire. Mass uneven distribution is identified from high-speed radial run out measurements subjected to subsequent mathematical analysis as presented herein. Mass uneven distribution characterization can be further applied to tire sorting processes and improvements to tire manufacturing, for example, in control and optimization of tire layer overlap or variation parameters. Measurement and analysis of tire high speed radial run out can also be coupled with low speed force measurements to determine and characterize tire high speed uniformity. Tire high speed uniformity characterization can also be applied to tire sorting processes and corresponding tire manufacturing process improvement.

Various features and aspects of the subject technology concerning tire parameter characterization and corresponding tire manufacturing aspects offer a plurality of advantages. A first advantage corresponds to the present subject matter providing both effective and efficient technology for predicting tire high speed uniformity, a tire parameter of more recently recognized significance. Tire high speed uniformity is predicted and controlled based on high speed radial run out measurements plus low speed force measurements. High speed radial run out measurements can be further used to predict and control mass unbalance in tires.

Known methods attempting to predict high speed uniformity consider multiple low speed parameters measured on low speed uniformity machines, without considering all identified effects of high speed radial run out (including, for example, mass unbalance). As such, the presently disclosed technology is advantageous by providing a correlation between mass unbalance and tire high speed uniformity.

Another advantage of the present subject matter is that the present subject matter offers effective steps and features for measuring mass unbalance in a tire for multiple harmonics, since previously known technologies have been unable to measure mass unbalance beyond its first harmonic. The effective indication of mass unbalance, including instances of mass uneven distribution and point mass, is important since any such mass unbalance can generate a significant amount of radial run out and related tire spindle force variations at high speeds.

In one exemplary embodiment of the present subject matter, a method of characterizing mass unbalance in a tire includes several steps, a first of which corresponds to establishing a plurality of tire parameters for a given tire. Such tire parameters may be measured or preprogrammed, and may include such parameters as a tested tire's mass, radius, inflation pressure, width, radial stiffness, and/or extensional stiffness as well as the mass and/or moment of inertia of the mounting fixture (e.g., a simulated wheel rim) to which a tire is mounted for testing.

Once a tire is mounted on the appropriate measurement machine, the tire is rotated at a relatively high speed on the order of 600+ rotations per minute such that radial run out measurements can be obtained. If the effects of radial stiffness variation are negligible to the tire radial run out (RRO), then RRO measurements are obtained at a low speed less than about 180 rotations per minute and at a first high rotational speeds. If radial stiffness variation does have a recognizable effect on the tire RRO, then RRO measurements are obtained at a low speed less than about 180 rotations per minute and one or two high rotational speeds. The RRO measurements are decomposed into multiple harmonics, from which mass uneven distribution coefficients are calculated. Mass uneven distribution coefficients determine the size and location of any mass unbalance (including instances of mass uneven distribution and point mass) existent in the tested tire.

The determination of mass unbalance in accordance with the above exemplary embodiment may then be utilized in a variety of subsequent fashions. The tested tire may be evaluated by grading the tire as one of a plurality of categories having predefined limitations. The tested tire may be sorted into groups such as one group that is acceptable for providing to a customer and another group that is altered, such as by grinding or adding mass, to rectify unacceptable levels of mass unbalance.

Additional embodiments of the present subject matter concern a method of manufacturing tires, which includes selected of the above-referenced aspects and steps of characterizing tire mass unbalance. Mass unbalance determinations can be compared with predetermined mass unbalance limitations, such as generated by a vehicle sensitivity test. The result of such comparison and related analysis can then be used in feedback to control the manufacture of subsequent tires responsive to the mass unbalance analysis.

In a still further embodiment of the present subject matter, a method of characterizing high speed uniformity of a tire includes the steps of providing a manufactured tire characterized by a plurality of layers, rotating the manufactured tire at a first predetermined rotational speed and obtaining at least one first force measurement, rotating the manufactured tire at a second predetermined rotational speed and obtaining at least one radial run out measurement, and determining from the at least one first force measurement and the at least one radial run out measurement the effect of layer overlap or variation for each of the plurality of layers in the manufactured tire. In some embodiments, the first predetermined rotational speed corresponds to a speed less than about 180 rotations per minute, while the second predetermined rotational speed corresponds to a speed greater than about 600 rotations per minute.

The determination of high speed uniformity in accordance with the above exemplary embodiment may then be utilized in a variety of subsequent fashions. The tested tire may be evaluated by grading the tire as one of a plurality of categories having predefined limitations. The tested tire may be sorted into groups such as one group that is acceptable for providing to a customer and another group that is altered, such as by grinding or adding mass, to rectify unacceptable levels of tire high speed uniformity.

Additional embodiments of the present subject matter concern a method of manufacturing tires, an example of which includes selected of the above-referenced aspects and steps of characterizing tire high speed uniformity. High speed uniformity characterizations can be compared with predetermined high speed uniformity limitations, such as generated by a vehicle sensitivity test or otherwise. The result of such comparison and related analysis can then be used in feedback to control the manufacture of subsequent tires responsive to the high speed uniformity. Since slight overlaps typically exist for each layer of a manufactured tire, high speed uniformity analysis may be employed to provide/adjust tolerance settings and optimized locations for each layer's overlap or variation.

In accordance with yet another embodiment of the presently disclosed technology, a method of manufacturing tires includes the steps of establishing complex transfer functions associated with tire characterization, constructing a set of production tires, rotating each production tire at a first rotational speed and obtaining at least one first force measurement, rotating each production tire at at least second and third rotational speeds and obtaining respective radial run out measurements from which to calculate any mass unbalance associated with each tire, and calculating high speed uniformity characteristics of each production tire based on the at least one first force measurement, the complex transfer functions, and the mass unbalance calculations. Manufacture of subsequent tires can then be controlled responsive to the calculated high speed uniformity characteristics. Furthermore, manufacturing steps such as grinding or adding mass to each tire may be effected to improve high speed uniformity characteristics of each production tire.

In further accordance with the above exemplary embodiment, it should be appreciated that the step of establishing complex transfer functions may be more particularly characterized by the steps of constructing a set of sample tires, rotating each sample tire at the first and second rotational speeds to obtain respective force measurements, rotating each sample tire at one of the first and second rotational speeds and at least one additional rotational speed and obtaining respective radial run out measurements, and determining complex transfer functions from the force and radial run out measurements. The transfer function characterizes the relationship between the second force measurement and the first force measurement plus the two radial run out measurements. In some embodiments, one of the first and second rotational speeds may be less than about 180 rotations per minute, while all other speeds may be above about 600 rotations per minute. All the force measurements may be decomposed into multiple harmonics before the complex transfer functions are determined.

Additional objects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
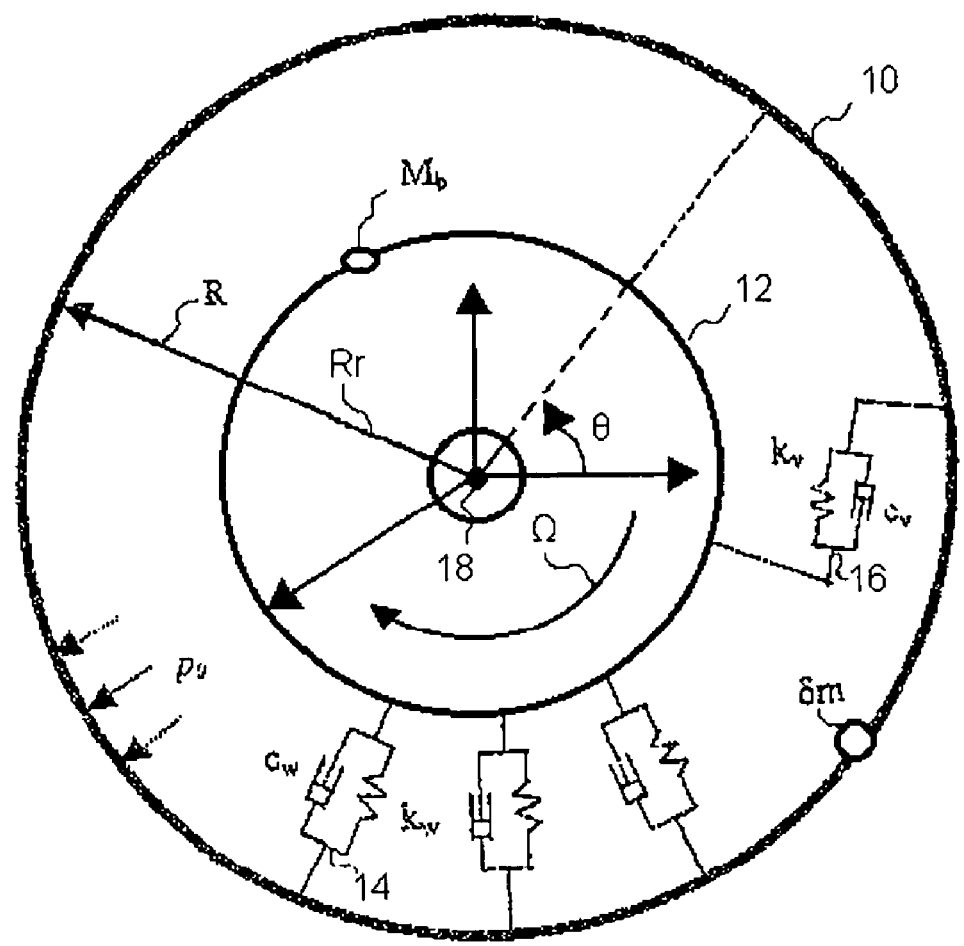
FIG. 1 illustrates a schematic diagram of an exemplary tire ring model in accordance with analytical technology of the presently disclosed technology.

Repeat use of reference characters throughout the present specification and appended drawings is intended to represent same or analogous features or elements of the invention.

DETAILED DESCRIPTION OF THE PREFERRED EMBODIMENTS

As discussed in the Brief Summary of the Invention section, the present subject matter concerns characterizing both mass uneven distribution and high speed uniformity of a tire. Mass uneven distribution is identified from high-speed radial run out measurements subjected to subsequent mathematical analysis as presented herein. Mass uneven distribution characterization can be further applied to tire sorting and/or grading processes and improvements to tire manufacturing, for example in control and optimization of tire layer overlap parameters. Measurement and analysis of tire high speed radial run out can also be coupled with low speed force measurements to determine and characterize tire high speed uniformity. Tire high speed uniformity characterization can also be applied to tire sorting processes and corresponding tire manufacturing process improvement.

Previous technology aimed at predicting high speed uniformity levels for tires (for example, that disclosed in U.S. Pat. No. 5,389,438) attempts prediction of tire high speed uniformity based on multiple low speed parameters such as radial run out (RRO), instantaneous rolling radius (IRR) and radial force variation (RFV). High speed RRO is a significant contributing factor of high speed uniformity. Prediction of high speed uniformity based only on parameters measured at low speeds fails to take into account at least one of the variables that contributes to high speed RRO, namely mass unbalance (e.g., mass uneven distribution). As such, the present subject matter obtains high speed RRO measurements in order to more accurately characterize high speed uniformity levels for a tire. Furthermore, such high speed RRO measurements can be decomposed to obtain information characterizing the mass unbalance of a tire, which may then be modified to reduce a tire's radial run out characteristics and improve high speed uniformity.

Figure 7A:
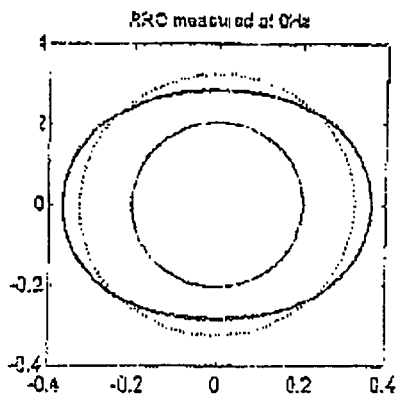
FIGS. 7A through 7D provide respective exemplary graphical illustrations of two-dimensional tire shape resulting from radial run out parameters as related to tire characterization in accordance with the presently disclosed technology.
Figure 7B:
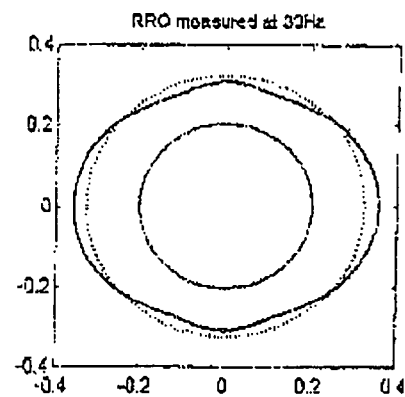
Figure 7C:
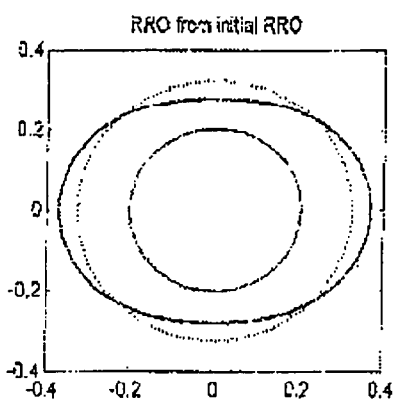
Figure 7D:
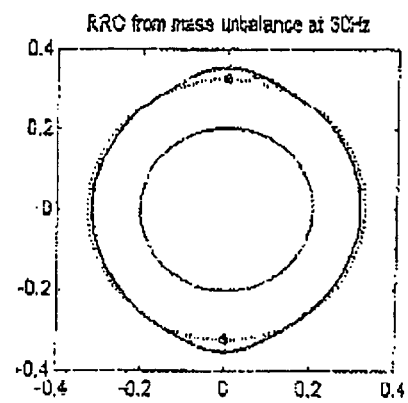
Figure 8:
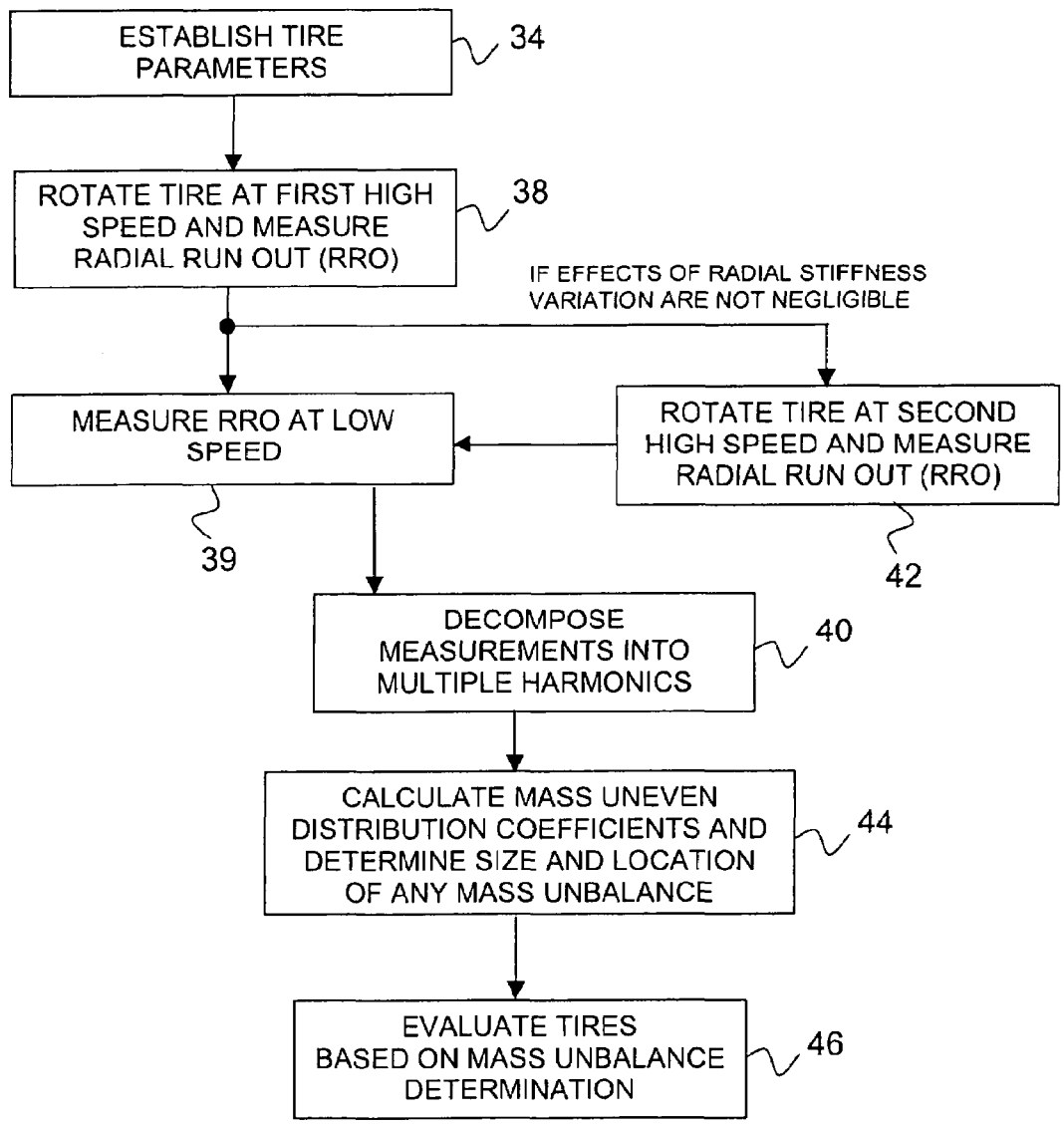
FIG. 8 provides a block diagram representation of exemplary process steps in accordance with characterization of tire mass unbalance in accordance with the presently disclosed technology.
Figure 9:
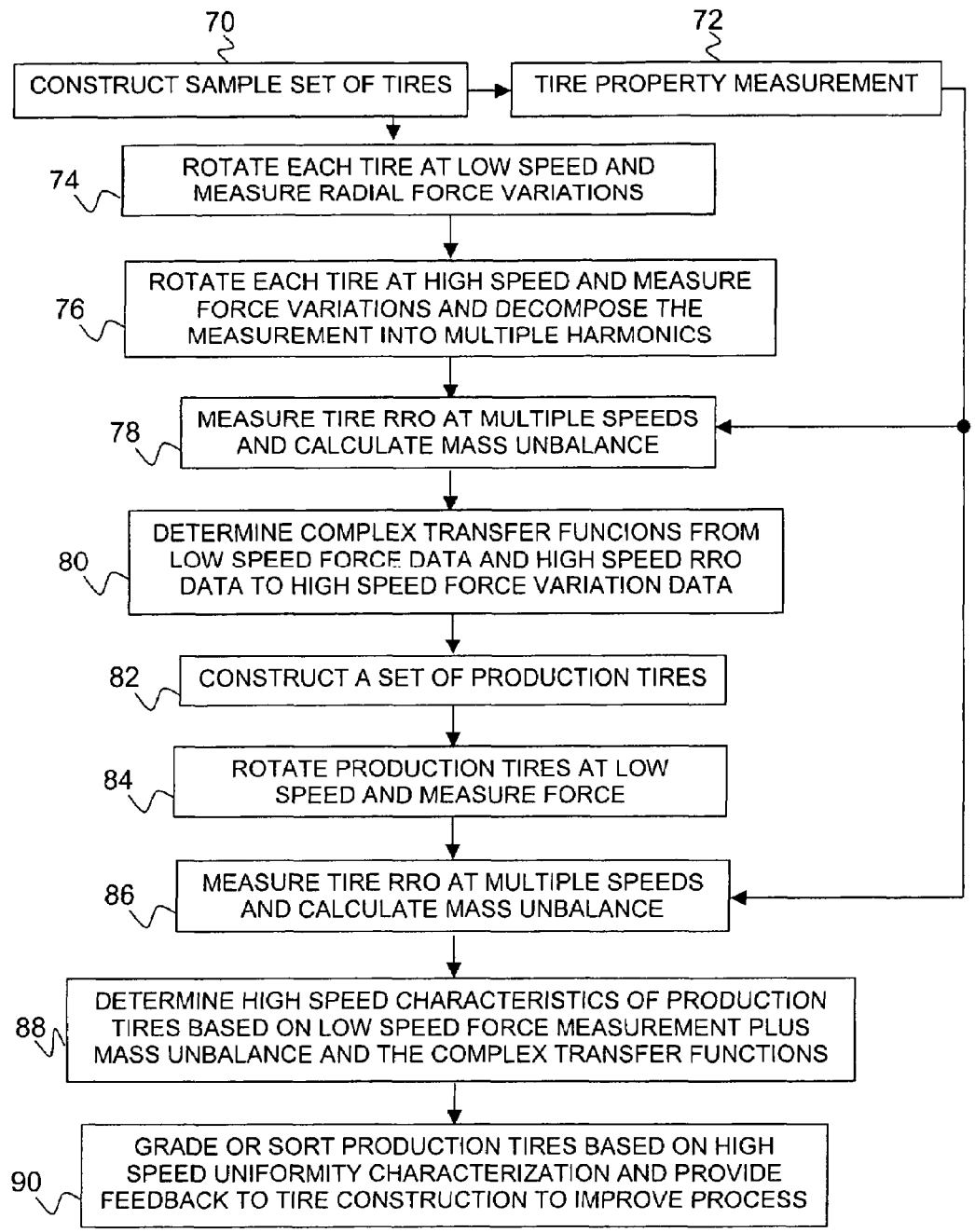
FIG. 9 provides a block diagram representation of exemplary process steps in accordance with characterization of tire high speed uniformity in accordance with the presently disclosed technology.
Figure 10:
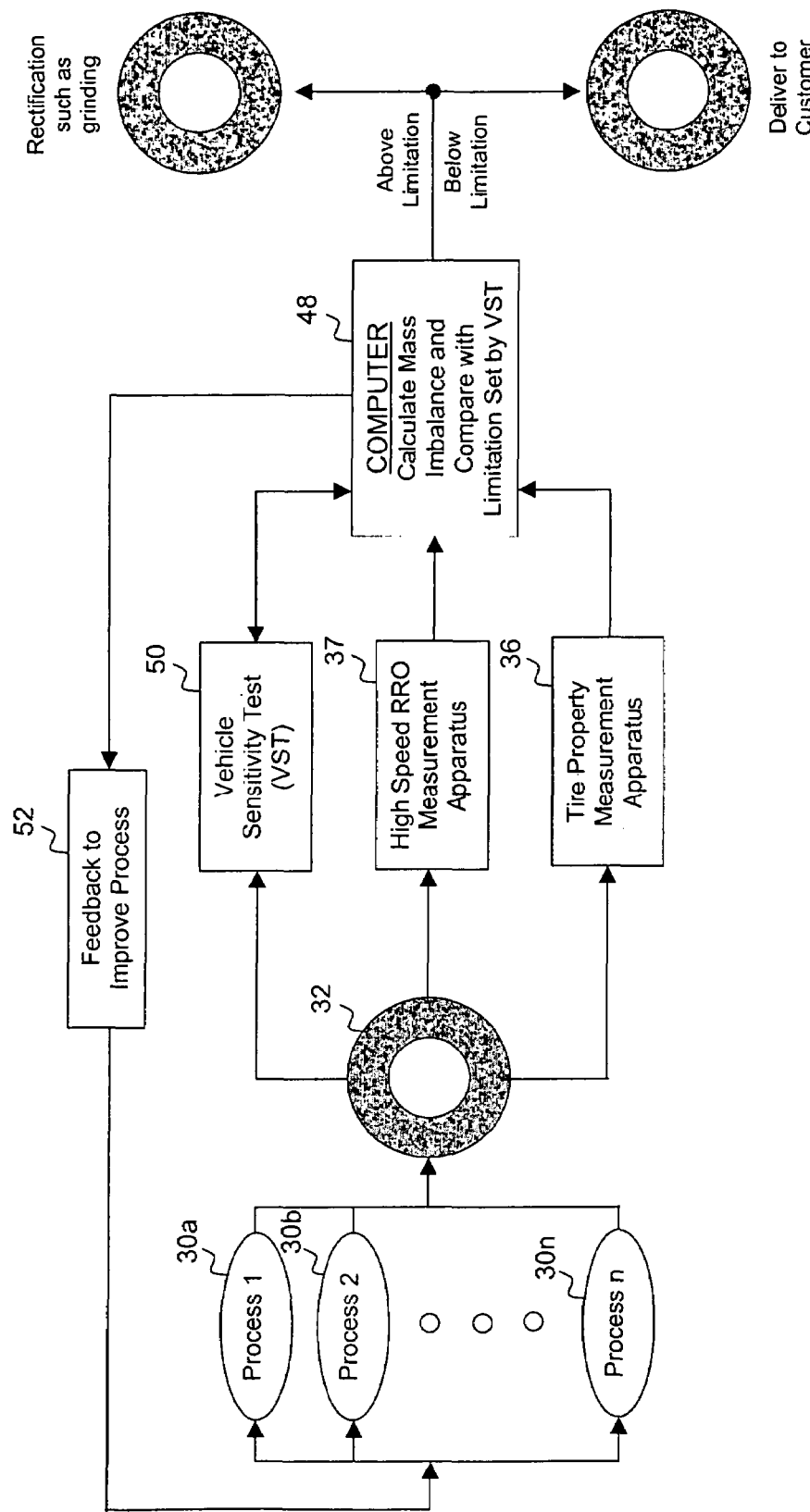
FIG. 10 provides a block diagram representation of exemplary aspects of tire manufacturing and sorting responsive to tire mass unbalance characterization in accordance with the presently disclosed technology.
Figure 11:
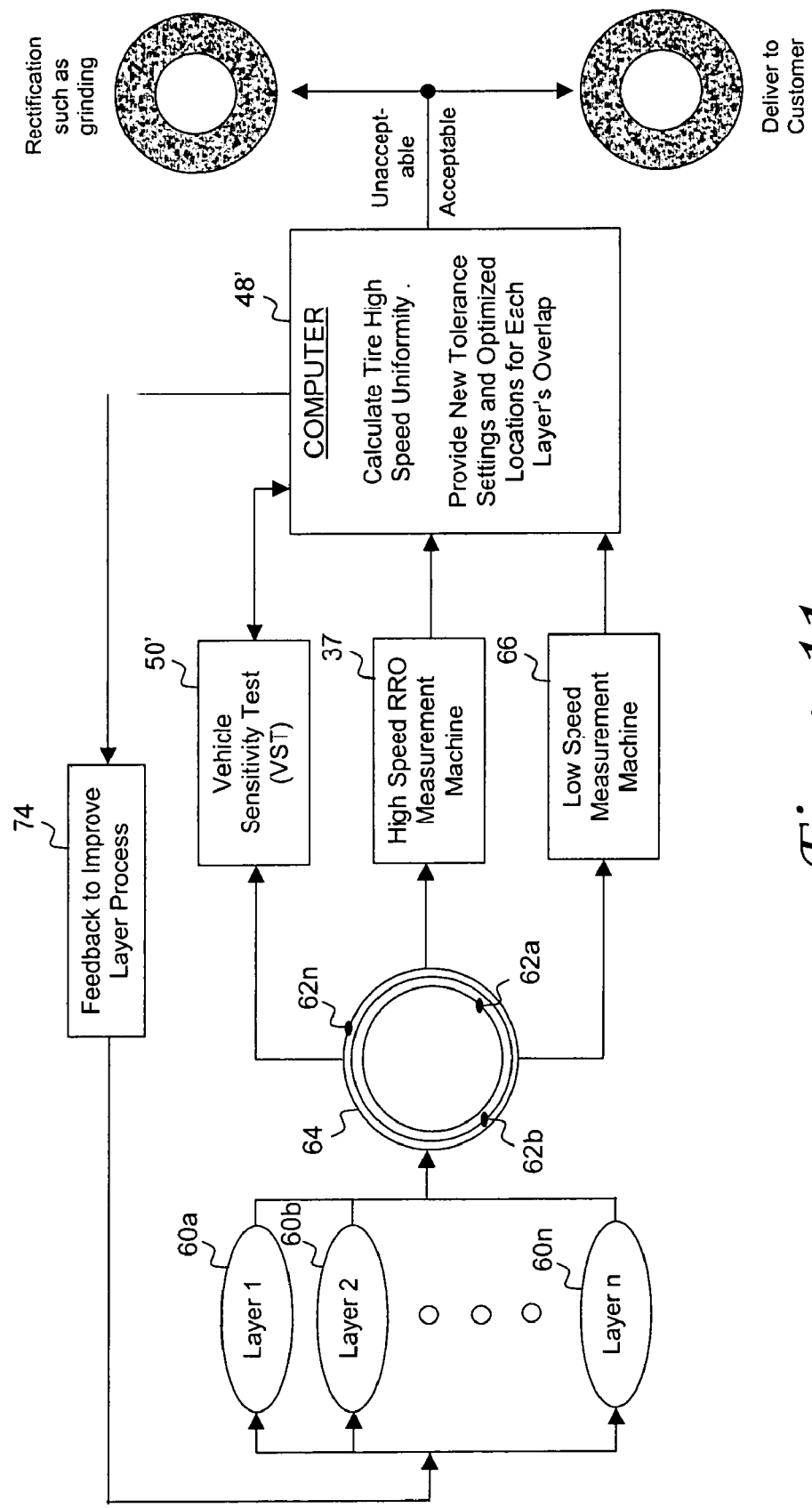
FIG. 11 provides a block diagram representation of exemplary aspects of tire manufacturing and sorting responsive to tire high speed uniformity characterization in accordance with the presently disclosed technology.

Aspects of tire modeling and numerical analysis that provide initial basis for the process applications and methodology of the present subject matter is presented hereafter with respect to FIGS. 1–7, respectively. More particularly, such discussion corresponds to algorithmic formulation and exemplary measurements for such attributes of tire high speed radial run out as initial uneven distribution of a tire radius, tire mass unbalance, variation in the normal stiffness distribution of a tire, variation in tangential stiffness distribution of a tire, and variation in bending stiffness distribution of a tire. The fundamentals presented in FIGS. 1–7 are subsequently applied to exemplary methodology in accordance with the present subject matter. FIGS. 8 and 10 provide respective exemplary representation of features and steps for characterizing tire mass unbalance, including instances of uneven mass distribution and/or point mass(es). FIGS. 9 and 11 provide respective exemplary representation of features and steps for characterizing tire high speed uniformity characteristics.

In accordance with aspects of the presently disclosed technology, determination of the various sources of high speed RRO (or crown deformation) enables a more accurate characterization of tire high speed uniformity and other parameters related thereto. Referring to FIG. 1, the tire is modeled as a generally circular flexible ring 10 connected to a mounting fixture 12, such as a wheel rim or other type of rigid disk. The rim is pined at its axis of rotation 18. Tire 10 is connected to the rim 12 by distributed radial springs 14 and tangential springs 16.

The tire non-uniformity attributes include mass imbalance $\delta m$ and the variation in radial stiffness $k_w$, tangential stiffness $k_r$, and the bending stiffness EI. In the initial state when the tire 10 is not pressurized and is not rotating, the tire 10 has a generally circular shape with a radius R. When the tire rotates at a high speed $\Omega$, the ring will be deformed to a non-circular form due to the existence of a non-uniformity. Following terminology will be used to reference certain parameters of a tire in rotation:

w: normal displacement in radial direction, ie, radial run out.

v: tangential displacement.

$p_0$: inflation pressure.

A: cross section area of the tire ring.
ρ: mass density of the tire ring.
b: width of the tire ring.
$\theta_r$: rim rotation relative to $\Omega$.
$R_r$: rim radius.
$q_w$: external force in normal direction.
$q_v$: external force in tangential direction.
θ: circumferential coordinate ranging from 0 to 2π.

Assume the tire ring is circular and the rim is pinned at wheel center, the equations of motion can be derived as the following:

$$\frac{\partial^2}{\partial \theta^2}\left[\frac{EI}{R^4}\left(\frac{\partial^2 w}{\partial \theta^2} - \frac{\partial v}{\partial \theta}\right)\right] + \frac{EA}{R^2}\left(w + \frac{\partial v}{\partial \theta}\right) + \quad (1.1\ a, d, c)$$

$$\frac{\partial}{\partial \theta}\left[\frac{\sigma_\theta^0 A}{R^2}\left(v - \frac{\partial w}{\partial \theta}\right)\right] + k_w w - \rho A \Omega^2 w - \frac{p_0 b}{R}\left(w + \frac{\partial v}{\partial \theta}\right) =$$

$$q_w + \left[p_0 b + \rho A R \Omega^2 - \frac{\sigma_\theta^0 A}{R}\right]\frac{\partial}{\partial \theta}\left[\frac{EI}{R^4}\left(\frac{\partial^2 w}{\partial \theta^2} - \frac{\partial v}{\partial \theta}\right)\right] -$$

$$\frac{\partial}{\partial \theta}\left[\frac{EA}{R^2}\left(w + \frac{\partial v}{\partial \theta}\right)\right] + \frac{\sigma_\theta^0 A}{R^2}\left(v - \frac{\partial w}{\partial \theta}\right) + k_v(v - R_r \theta_r) -$$

$$\rho A \Omega^2 v + \frac{p_0 b}{R}\left(\frac{\partial w}{\partial \theta} - v\right) = q_v \int_0^{2\pi} R R_r k_v (v - R_r \theta_r) d\theta = 0$$

where $$\sigma_\theta^0 A = p_0 b R + \rho A R^2 \Omega^2, \text{ if the initial state is pre-stressed by } p_0 \text{ and } \Omega.\quad (1.1\ d)$$

$$= 0, \quad \text{if the initial state has no pre-stress.}$$

Equation (1.1a, b, c, d) can be used to study non-uniformity caused by the uneven distribution of mass m, radial stiffness $k_w$, tangential stiffness $k_v$, the bending stiffness EI, as well as the non-uniform distribution of the tire radius (RRO), as presented hereafter in more particular detail.

Radial Run Out Generated by Initial Uneven Distribution of Ring Radius, $R_i$

Aspects of how a non-circular ring will change its shape after being pressurized and under rotation are now considered. Due to the difficult nature of characterizing a non-circular ring, the approach is taken to assume that tire 10 is a circular tire with radius R and no pre-stress. External force $q_w^0$ is applied so that the ring deformation $w^0$ satisfies the following requirement $$w^0 = R - R_i, \quad (2.1)$$

where $R_i$ is a function of θ representing the initial radius of the non-circular ring, and R is given by $$R = \text{average}(R_i). \quad (2.2)$$

As to be discussed later, the tangential force can be assumed as zero, ie, $q_v^0 = 0$. Referring to the equations of motion, $w^0$ is the initial radial run out given by equation (2.1), and the unknowns $q_w^0$ and $v^0$ are determined to be:

$$q_w^0 = \sum_{n=1}^\infty H_n(a_n \cos(n\theta) + b_n \sin(n\theta)), \quad (2.3\ a, b)$$

-continued $$v^0 = \sum_{n=1}^\infty G_n(b_n \cos(n\theta) - a_n \sin(n\theta))$$

where $a_n$ and $b_n$ can be calculated from the initial radial run out given by equation (2.1):

$$a_n = \frac{1}{\pi}\int_0^{2\pi} w^0 \cos(n\theta) d\theta, \ b_n = \frac{1}{\pi}\int_0^{2\pi} w^0 \sin(n\theta) d\theta, \quad (2.4\ a, b)$$

where $G_n$ is given by $$G_n = \frac{\frac{EI}{R^4}n^3 + \frac{EA}{R^2}n}{\frac{EI}{R^4}n^2 + \frac{EA}{R^2}n^2 + k_v}, \quad (2.5)$$

and where $H_n$ is given by $$H_n = \frac{\frac{EA}{R^2}\frac{EI}{R^4}n^2(n^2-1)^2 + k_v\left(\frac{EA}{R^2} + \frac{EI}{R^4}n^4\right)}{\frac{EI}{R^4}n^2 + \frac{EA}{R^2}n^2 + k_v} + k_w. \quad (2.6)$$

It should be noted that since the tire has not been pressurized, all the stiffnesses in equation (2.6) should be those before inflation.

If the tire ring is in-extensible, or $$\frac{EA}{R^2} \gg k_w, \ \frac{EA}{R^2} \gg k_v, \ \frac{EA}{R^2} \gg \frac{EI}{R^4},$$

for lower harmonics, equations (2.5) and (2.6) simplify.

It should be noted that $q_w^0$ and $w^0$ should have the same phase for each of the harmonics. This means that, for each of the harmonics, the force needed to deform a circular tire ring to a specified non-circular tire with an initial radial run out as $w^0$ is always proportional to $w^0$ without any phase shift.

Now, for the same non-circular tire ring, if the same amount of force is applied to the tire but in the opposite direction, the same circular tire that was initially provided should be obtained.

Therefore, $q_w^0$, given by equation (2.3a) can be used to characterize the non-circular part of the tire ring. v and w are unknowns in the equations of motion created by pressure and rotation.

The solution is determined to be:

$$w = \frac{p_0 b + \rho A R \Omega^2}{\frac{EA}{R^2} + k_w - \rho A \Omega^2 - \frac{p_0 b}{R}} + \sum_{n=1}^{\infty} Q_n(a_n \cos(n\theta) + b_n \sin(n\theta)) \quad (2.7\ a,\ b)$$

$$v = \sum_{n=1}^{\infty} Q_n P_n (b_n \cos(n\theta) - a_n \sin(n\theta)),$$

where $a_n$ and $b_n$ can be calculated from the initial radial run out given by equations (2.4a and b).

Furthermore, $P_n$ is given as:

$$P_n = \frac{\frac{EI}{R^4} n^3 + \frac{EA}{R^2} n - \frac{p_0 b}{R} n}{\frac{EI}{R^4} n^3 + \frac{EA}{R^2} n^2 + k_v - \rho A \Omega^2 - \frac{p_0 b}{R}}, \quad (2.8)$$

and $Q_n$ is given as:

$$Q_n = \frac{H_n}{\frac{EI}{R^4}(n^4 - n^3 P_n) + \left(\frac{EA}{R^2} - \frac{p_0 b}{R}\right)(1 - n P_n) + (k_w - \rho A \Omega^2)} \quad (2.9)$$

Therefore, for an initially non-circular tire, the radial run out generated by the pressure and rotation contains a uniform expansion part and a varying part. The amplitude of each harmonic of the varying part is proportional to that of the initial radial run out without any phase shift. Through $Q_n$ the inflation and rotation are acting as a knob tuning the amplitude of the initial radial run out. Inflation reduces the radial run out, but the rotation increases it.

If the tire ring is in-extensible, or $$\frac{EA}{R^2} \gg k_w, \frac{EA}{R^2} \gg k_v, \frac{EA}{R^2} \gg \frac{EI}{R^4},$$

the uniform expansion part goes to zero. Even though the tire is in-extensible, the tire will deform under the rotation due to the initial radial run out of the tire.

Radial Run Out Generated by Mass Unbalance

The non-uniformity caused by the uneven distribution of mass is now considered. In this case, the ring is pre-stressed and the external force is the centrifugal force generated by the mass unbalance. In addition, EI, $k_w$, and $k_v$, are considered as constants. Tire uniform growth has been subtracted from the formulation since it has no effect on the solution. The analysis is simplified by assuming the pre-stressed ring is in-extensible, which gives $$w = \frac{\partial v}{\partial \theta}. \quad (3.1)$$

Since the free spin is in the steady state, vibration does not exist and rotational displacement $\theta_r$ of the rim relative to the spindle could be considered as zero.

A solution for the tangential displacement (v) can be solved by:

$$v = \sum_{n=1}^{\infty} (A_n \cos(n\theta) + B_n \sin(n\theta)). \quad (3.2)$$

The following solutions for $A_n$ and $B_n$ are obtained:

$$A_n = \frac{\frac{1}{\pi} \int_0^{2\pi} \cos(n\theta) \frac{\partial q_w}{\partial \theta} d\theta}{\frac{EI}{R^4} n^2 (n^2 - 1)^2 + \frac{p_0 b}{R}(-n^2 + n^4) + k_w n^2 + k_v + \rho A \Omega^2 (-3n^2 + n^4)} \quad (3.3a)$$

$$B_n = \frac{\frac{1}{\pi} \int_0^{2\pi} \sin(n\theta) \frac{\partial q_w}{\partial \theta} d\theta}{\frac{EI}{R^4} n^2 (n^2 - 1)^2 + \frac{p_0 b}{R}(-n^2 + n^4) + k_w n^2 + k_v + \rho A \Omega^2 (-3n^2 + n^4)}, \quad (3.3b)$$

for n=1, 2, 3, . . . , where n represents the number of harmonics in the response. Substitution of equations (3.3a) and (3.3b) into equation (3.2) and then into equation (3.1) yields the solution for the radial run out of a tire with mass unbalance.

Considering now an example for uneven distributed mass, the force generated by an uneven distributed mass can be expressed as:

$$q_w = R\Omega^2 \delta m, \quad (3.4a)$$

$$\delta m = \sum_{n=1}^{\infty} (e_n \cos(n\theta) + f_n \sin(n\theta)). \quad (3.4b)$$

The solution of the radial run out for the distributed mass unbalance is determined to be:

$$w = \sum_{n=1}^{\infty} \Delta_n (e_n \cos(n\theta) + f_n \sin(n\theta)), \quad (3.5)$$

where $e_n$ and $f_n$ can be calculated from the mass unbalance distribution given by Equation (3.4b) and $\Delta_n$ is given by:

$$\Delta_n = \frac{R \Omega^2 n^2}{\frac{EI}{R^4} n^2 (n^2 - 1)^2 + \frac{p_0 b}{R}(-n^2 + n^4) + k_w n^2 + k_v + \rho A \Omega^2 (-3n^2 + n^4)}. \quad (3.6)$$

Radial Run Out Generated by Variation in Radial Stiffness ($k_w$)

Assume the mass, tangential stiffness, and the bending stiffness are uniformly distributed around the ring. Also, the ring is not pre-stressed and no other external forces exist except the pressure and the centrifugal force. v is required to be a periodic function of θ and cannot be a constant. If $k_w$ is considered as a constant $K_{w0}$, the equations of motion have the following solution:

$$v_0 = 0$$

$$w_0 = \frac{p_0 b + \rho A R \Omega^2}{\frac{EA}{R^2} + K_{w0} - \rho A \Omega^2 - \frac{p_0 b}{R}}. \quad (4.1\ a, b)$$

Equation (4.1b) is the radial deformation caused by the inflation pressure and rotation, representing the uniform tire growth under the inflation pressure and rotation. Normally, EA is very high and therefore $w_0$ is very small.

The radial stiffness can be decomposed into the constant part and the varying part:

$$k_w = K_{w0} + \delta K_w(\theta), \quad (4.2a)$$

where $\delta K_w$ can be expressed as:

$$\delta K_w = \sum_{n=1}^{\infty} (\alpha_n \cos(n\theta) + \beta_m \sin(n\theta)) \quad (4.2b)$$

Accordingly, w is decomposed into the constant part and the varying part:

$$w = w_0 + \delta w, \quad (4.3)$$

where $w_0$ is given by equation (4.1b). Furthermore, assume that:

$$\delta w = \sum_{n=1}^{\infty} (A_n \cos(n\theta) + \beta_n \sin(n\theta)) \quad (4.4a, b)$$

$$v = \sum_{n=1}^{\infty} (C_n \cos(n\theta) + D_n \sin(n\theta)),$$

A number of calculations can lead to the following solutions for the equations of motion:

$$\delta w = -w_0 \sum_{n=1}^{\infty} Q'_n (\alpha_n \cos(n\theta) + \beta_n \sin(n\theta)) \quad (4.5a, b)$$

$$v = -w_0 \sum_{n=1}^{\infty} P_n Q'_n (\beta_n \cos(n\theta) - \alpha_n \sin(n\theta)).$$

where, $$P_n = \frac{\frac{EI}{R^4} n^3 + \frac{EA}{R^2} n - \frac{p_0 b}{R} n}{\frac{EI}{R^4} n^2 + \frac{EA}{R_2} n^2 + k_v - \rho A \Omega^2 - \frac{p_0 b}{R}}, \quad (4.6)$$

which is the same as equation (2.8), and where $$Q'_n = \frac{1}{\frac{EI}{R^4}(n^4 - n^3 P_n) + \left(\frac{EA}{R^2} - \frac{p_0 b}{R}\right)(1 - n P_n) + (K_{w0} - \rho A \Omega^2)}. \quad (4.7)$$

It should be noted that if the tire ring is in-extensible, $w_0$ will be zero, leading to zero radial run out. This means that for an in-extensible tire ring, the radial stiffness variation will not generate any radial run out when the tire is under pressure and rotation.

In an actual tire, extensional stiffness EA of the belt may be relatively high. In such case, the radial run out generated by the radial stiffness variations should be much smaller than that generated by the mass uneven distribution.

Radial Run Out Generated by Variation in Tangential Stiffness ($k_v$)

Assume the mass, normal stiffness, and the bending stiffness are uniformly distributed around the ring. Also, the ring is not pre-stressed and no other external forces exist except the pressure and centrifugal force.

It can be proven that the only solution to the equations of motion is zero, which means that uneven tangential stiffness distribution will not generate any radial run out after the pressure and rotation.

Radial Run Out Generated by Variation in Bending Stiffness (EI)

Assume the mass, normal and tangential stiffness, are uniformly distributed around the ring. Also, the ring is not pre-stressed and no other external forces exist except pressure and the centrifugal force.

It can be proven that the only solution to this problem is the zero solution. Therefore, the bending stiffness variation will not induce radial run out in a circular tire after inflation and rotation.

Numerical examples will now be presented with regard to the radial run out analysis presented above. Assume that the following tire parameters as presented in Table 1 are obtained for an exemplary tire.

TABLE 1

Tire Parameters

| PARAMETER: | VALUE: | UNITS: |
|---|---|---|
| Radius (R) | 0.326 | M |
| Tire summit linear mass density (ρA) | 3.35 | kg/m |
| Pressure ($p_o$) | 207 | kPa |
| Tire width (b) | 0.142 | M |
| Radial Stiffness ($k_w$) | 1.44*10^6 | N/m^2 |
| Tangential Stiffness ($k_v$) | 2.61*10^5 | N/m^2 |
| Bending Stiffness (EI) | 1.35 | Nm^2 |
| Extensional Stiffness (EA) | 6.48*10^6 | N |

EXAMPLES

Radial Run Out Generated by Uneven Mass Distribution

Figure 2:
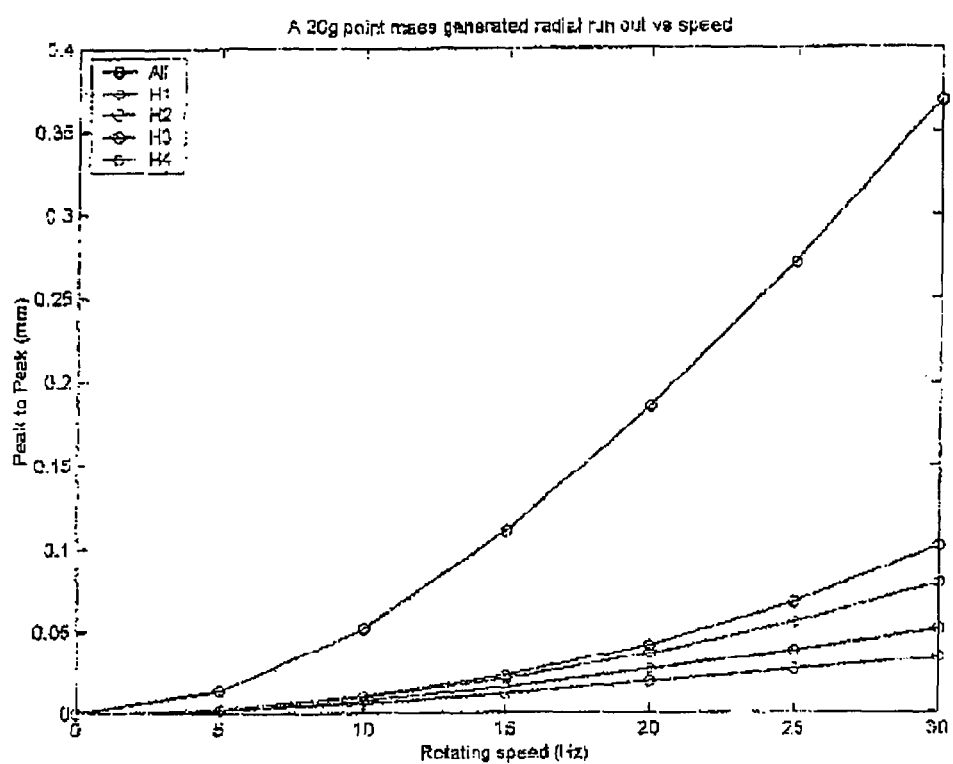
FIG. 2 provides an exemplary graphical illustration of generated radial run out versus rotating speed for a tire with given point mass as related to tire characterization in accordance with the presently disclosed technology.

FIG. 2 plots the change of the peak to peak values (2× amplitude) versus rotating speed for the first four harmonics and the peak to peak value of the summation of the first 20 harmonics (denoted All) for the tire with a 20 g point mass. As can be seen, there is no radial run out generated at a rotating speed of zero. As the speed increases, the amplitudes of all harmonics increase significantly.

Figure 3:
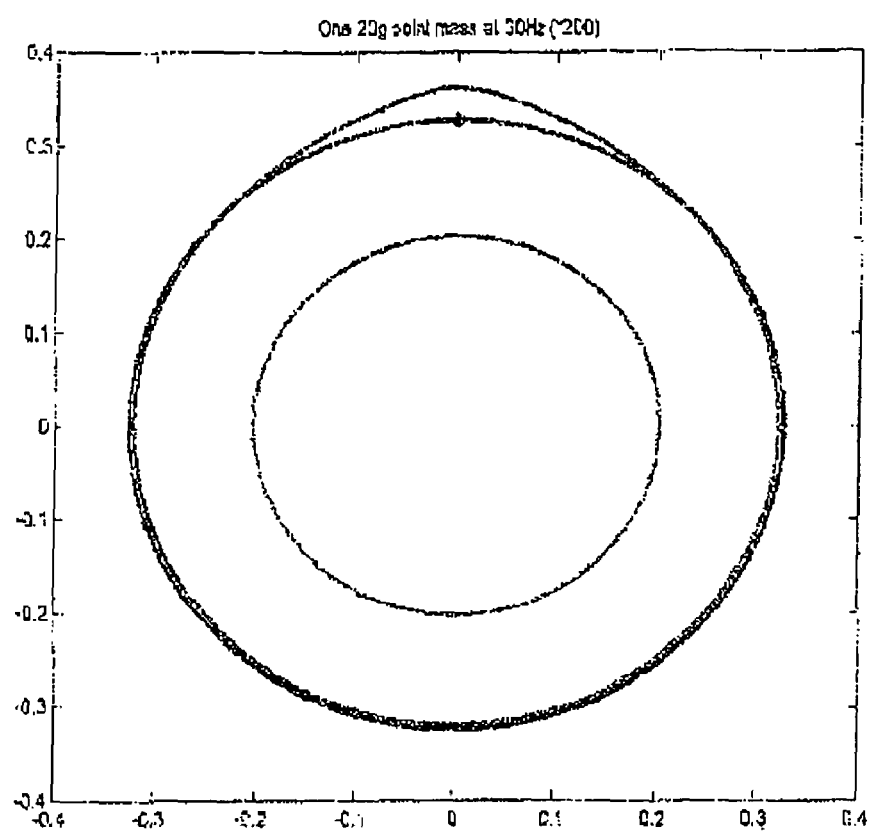
FIG. 3 provides an exemplary graphical illustration of two-dimensional tire shape for a given point mass at different rotating speeds as related to tire characterization in accordance with the present subject matter.

FIG. 3 visually demonstrates the exemplary deformation of a tire with one 20 gram point mass located at θ=π/2 when the tire is not spinning and also when the tire is spinning at 30 Hz. As illustrated, the radial run out reaches its maximum at the location of the point mass. Note that the deformation has been amplified by 200 times in FIG. 3.

Figure 4:
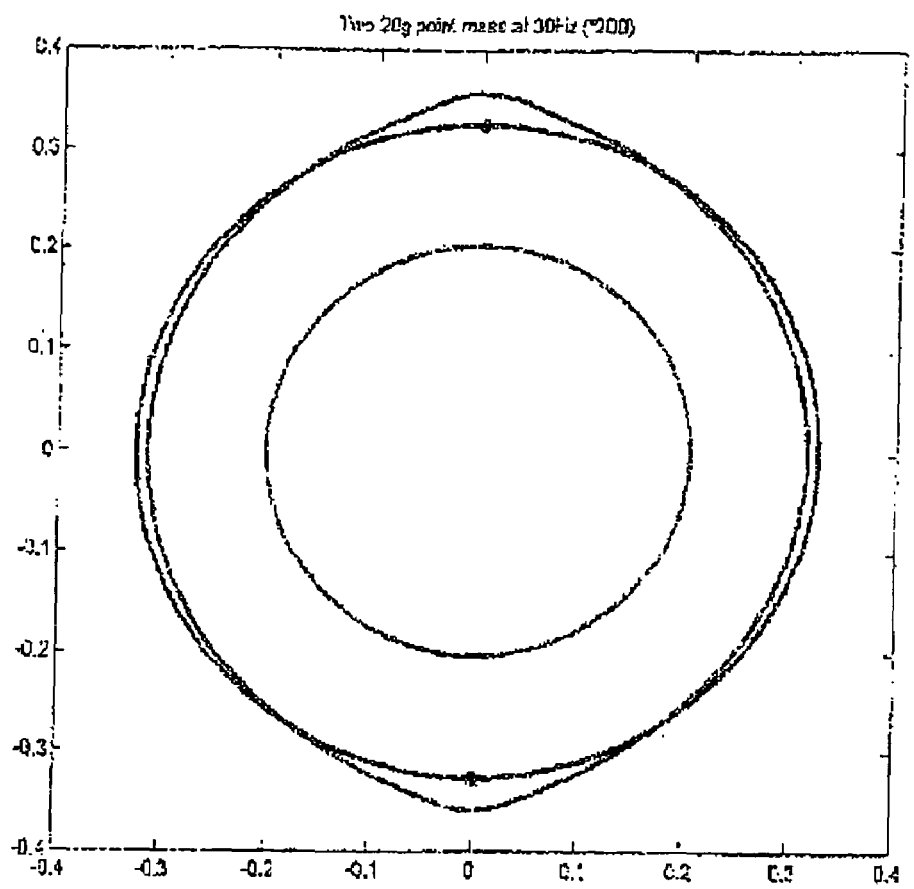
FIG. 4 provides an exemplary graphical illustration of two-dimensional tire shape for multiple given point masses at different rotating speeds as related to tire characterization in accordance with the present subject matter.

FIG. 4 visually demonstrates the exemplary deformation of a tire with two 20 gram point masses located 180 degrees apart (at θ=π/2 and θ=3π/2) when the tire is not rotating and also when the tire is spinning at 30 Hz. As illustrated, the location of the maximum displacement always shares the same position as the point mass. Note that the deformation has been amplified by 200 times in FIG. 4.

Figure 5:
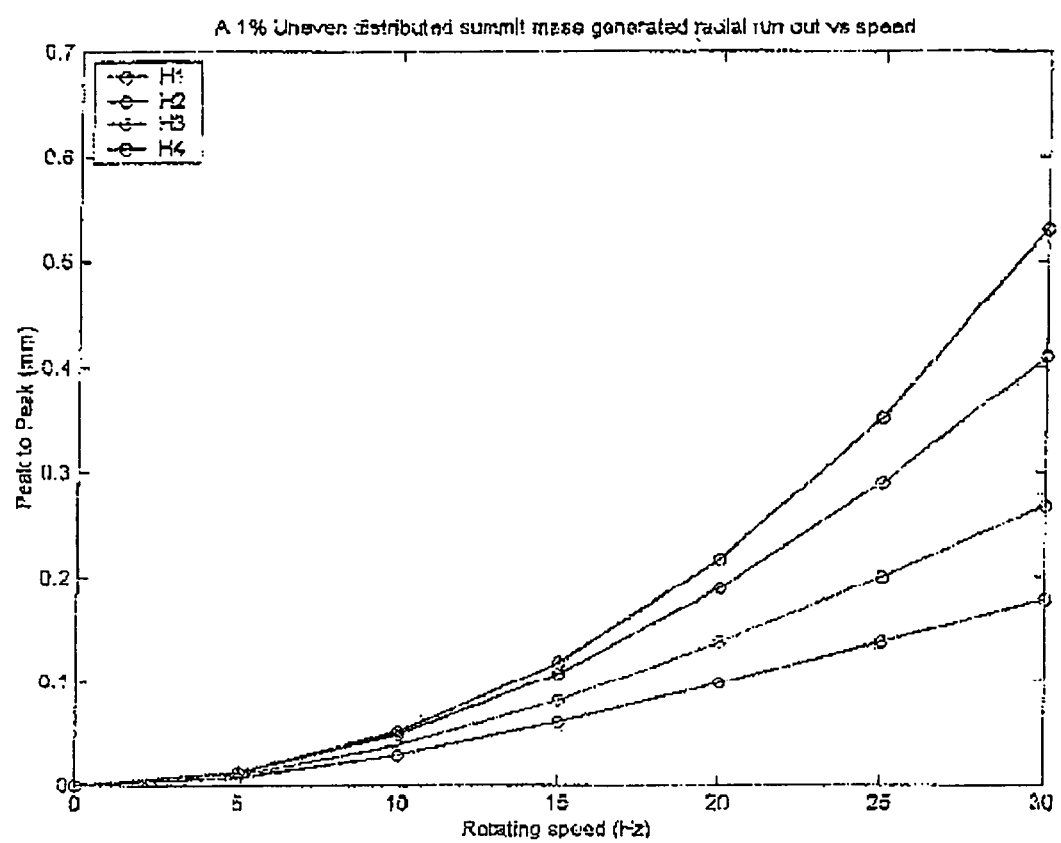
FIG. 5 provides an exemplary graphical illustration of generated radial run out versus rotating speed for a given one percent distributed summit mass as related to tire characterization in accordance with the presently disclosed technology.

As a second example, radial run out generated by a tire having an uneven distributed mass of 1% of the tire summit mass density. FIG. 5 plots the change of the peak to peak values versus rotating speed for the first four harmonics for this exemplary case of uneven mass distribution. As illustrated in FIG. 5, as the speed increases, the amplitudes of all harmonics increase significantly.

EXAMPLES

Radial Run Out Generated by Uneven Radial Stiffness Distribution

Figure 6:
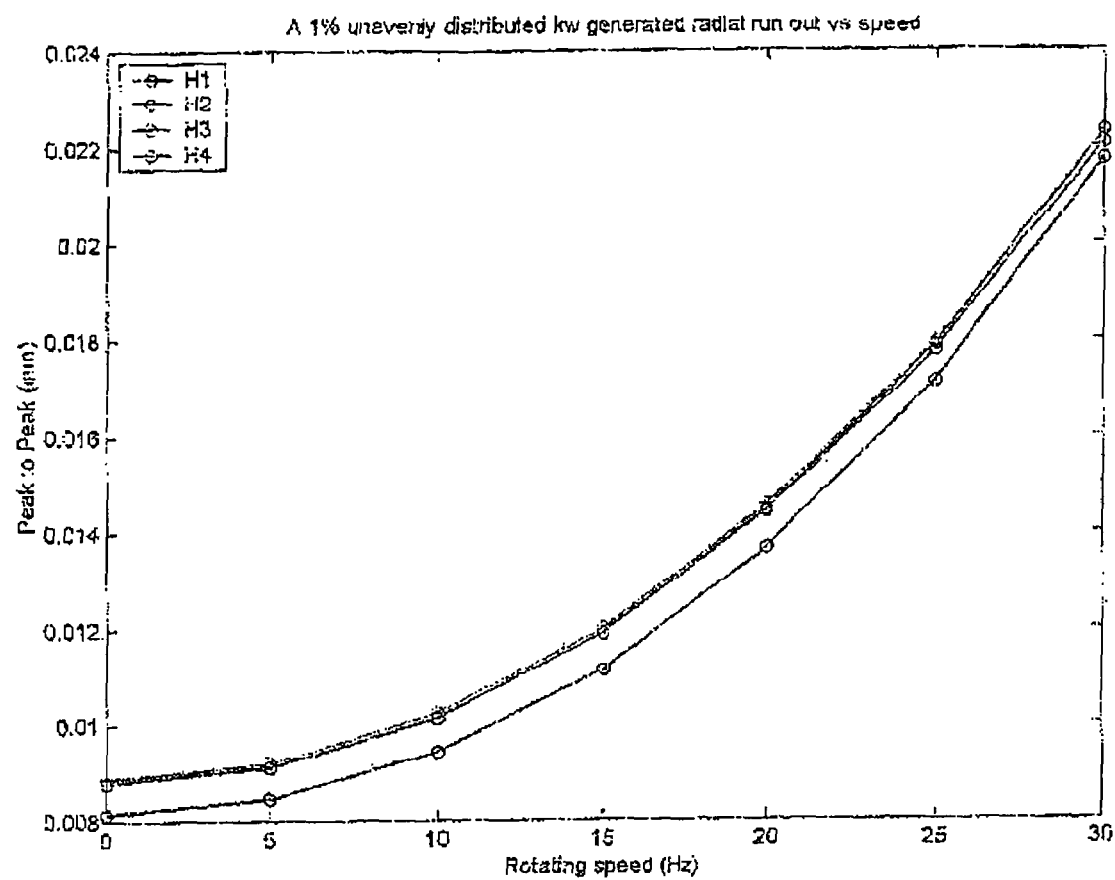
FIG. 6 provides an exemplary graphical illustration of generated radial run out versus rotating speed for a given one percent unevenly distributed radial stiffness as related to tire characterization in accordance with the presently disclosed technology.

The following example concerns radial run out generated by an exemplary unevenly distributed radial stiffness. FIG. 6 plots the peak to peak values of the first four harmonics of the radial run out versus tire rotating speed. A 1% unevenly distributed radial stiffness distribution is used in the calculation. At a low speed less than about 180 rotations per minute, the radial run out after inflation is very small. As speed increases, the radial run out increases. At 30 Hz, it reaches to about 0.022 mm for all harmonics. Compared to FIG. 5, at high rotation speed, the radial run out generated by the unevenly distributed radial stiffness is mach smaller than that generated by the unevenly distributed mass.

Based on the above analysis and examples regarding tire radial run out, several conclusions can be made. No matter what kind of non-uniformity a tire has, the tire will undergo a uniform growth when it is pressurized and rotated. Pressure and rotation will increase tire radius. The less extensible the tire summit, the less expansion of the tire radius.

Initial radial run out will generate tire radial run out when it is pressurized and rotated. Pressure will reduce the radial run out, but the rotation will increase the radial run out. Pressure and rotation, however, will not change the phase of the radial run out.

Radial stiffness variation will generate tire radial run out when a tire is pressurized and rotated. Increasing rotating speed will increase the amplitude of the radial run out. The phase of the radial run out will be opposite to that of the radial stiffness variation. If the tire summit is not extensible, the radial run out generated by the radial stiffness variation will be zero.

Uneven mass distribution will generate tire radial run out when it is rotated. Increasing rotating speed will increase the amplitude of the radial run out significantly. The phase of the radial run out generated by the mass variation is the same as the phase of the mass variation itself.

If the mass unbalance is point mass, the maximum deformation is located at the same position of the point mass.

Tangential and bending stiffness variations will not generate radial run out.

Variation of tire ring extensional stiffness may also generate radial run out. Such effect is not presented here but can be treated mathematically in the same manner if necessary.

The above mathematical analysis provides a basis for measurements and corresponding algorithmic applications developed in accordance with the present subject matter. One exemplary application of the presently disclosed technology corresponds to identification of mass unbalance (including mass uneven distribution and point mass) from high speed RRO measurements. Mass uneven distribution will generate a significant amount of RRO at high speed. If a tire is loaded against a flat surface or road wheel on a measurement apparatus, such generated RRO will be suppressed by the surface and forces will consequently be produced at the wheel center. As such, mass unbalance is also a key contributing element in generating spindle force variations at high speed. For at least these reasons, identification of mass unbalance becomes a useful application.

FIGS. 8 and 10 illustrate exemplary features for characterizing mass unbalance in a tire. Initially, it should be appreciated that many various processes, as known in the art, are employed in the actual construction of an individual tire. Such tire building processes may, for example, include applying various layers of rubber compound and/or other suitable materials to form the tire carcass, providing a tire belt portion and a tread portion to form the tire summit block, curing the finished green tire, etc. Such processes are represented as 30a, 30b, . . . , 30n in FIG. 10 and combine to form exemplary tire 32. It should be appreciated that a batch of multiple tires may be constructed from one iteration of the various processes 30a through 30n, respectively. After a tire is constructed, a plurality of measurements must be established in order to characterize mass unbalance in accordance with the present subject matter.

Referring now to FIG. 8, a first step 34 in an exemplary process of characterizing mass unbalance of a tire is to establish various tire parameters, such as previously identified in Table 1. Such tire parameters may include, for example, the tire radius, tire width, tire summit mass, tire pressure, tire radial stiffness, tire tangential stiffness, tire bending stiffness, and tire extensional stiffness. Such parameters may be obtained by a tire property measurement apparatus 36 (see FIG. 10), as are well known to those in the art, or may alternatively be established prior to the subject methodology and entered as known variables for processing in subsequent computer analysis.

A second step 38 in a process of characterizing mass unbalance is to rotate the particular tire and obtain RRO measurements. The tire may be positioned on a mounting fixture (typically having similar qualities to a tire rim or other rigid disk) of a high speed radial run out measurement apparatus 37 (see FIG. 10). Examples of some such RRO measurement apparatus for low speed are provided in U.S. Pat. No. 5,396,438 (Oblizajek) and U.S. Pat. No. 5,245,867 (Sube et al.), which are both incorporated herein by reference for all purposes. An RRO measurement apparatus is able to identify and maintain a reference point on a tire while it is rotating at the desired speeds. The tire is then rotated at a first high rotating speed, such as one that corresponds to typical highway speeds. For purposes of the present subject matter, a "high speed" at which various measurements are obtained and analyzed corresponds to a rotating speed of at least about 600 rpm (about 10 Hz). In some cases, such relatively high rotating speeds are between about 20–30 Hz or higher.

It should be appreciated from the previously presented mathematical analysis that high speed RRO (such as measured in steps 38, 39 and 42) can be decomposed into the harmonics:

$$w = A_0 + \sum_{n=1}^{\infty} (A_n \cos(n\theta) + B_n \sin(n\theta)). \quad (7.1)$$

Where n represents the harmonic number. Thus, a step 40 corresponds to decomposing the RRO measurements obtained in step 38 into multiple harmonics based on equation (7.1). The tire deformation actually comes from four sources:

tire uniform growth, $w_0$,
initial RRO, $$w^0 = \sum_{n=1}^{\infty} (a_n \cos(n\theta) + b_n \sin(n\theta)), \quad (7.2)$$

radial stiffness variation, $$\delta K_w = \sum_{n=1}^{\infty} (\alpha_n \cos(n\theta) + \beta_n \sin(n\theta)), \quad (7.3)$$

and mass uneven distribution $$\delta m = \sum_{n=1}^{\infty} (e_n \cos(n\theta) + f_n \sin(n\theta)). \quad (7.4)$$

Based on the solutions previously presented, the measured RRO should be the combination of all the above contributions:

$$\begin{aligned} w &= A_0 + \sum_{n=1}^{\infty} (A_n \cos(n\theta) + B_n \sin(n\theta)) \\ &= w_0 + \sum_{n=1}^{\infty} Q_n(a_n \cos(n\theta) + b_n \sin(n\theta)), \\ &\quad -w_0 \sum_{n=1}^{\infty} Q_n'(\alpha_n \cos(n\theta) + \beta_n \sin(n\theta)) \\ &\quad + \sum_{n=1}^{\infty} \Delta_n(e_n \cos(n\theta) + f_n \sin(n\theta)) \end{aligned} \quad (7.5)$$

where $$w_0 = \frac{p_0 b + \rho A R \Omega^2}{\frac{EA}{R^2} + k_w - \rho A \Omega^2 - \frac{p_0 b}{R}},$$

$$Q_n = \frac{H_n}{\frac{EI}{R^4}(n^4 - n^3 P_n) + \left(\frac{EA}{R^2} - \frac{p_0 b}{R}\right)(1 - n P_n) + (k_w - \rho A \Omega^2)},$$

-continued $$Q_n' = \frac{1}{\frac{EI}{R^4}(n^4 - n^3 P_n) + \left(\frac{EA}{R^2} - \frac{p_0 b}{R}\right)(1 - n P_n) + (K_{w0} - \rho A \Omega^2)},$$

$$\Delta_n = \frac{R \Omega^2 n^2}{\frac{EI}{R^4} n^2 (n^2 - 1)^2 + \frac{p_0 b}{R}(-n^2 + n^4) + k_w n^2 + k_v + \rho A \Omega^2(-3n^2 + n^4)},$$

and $$H_n = \frac{\frac{EA}{R^2} \frac{EI}{R^4} n^2 (n^2 - 1)^2 + k_v \left(\frac{EA}{R^2} + \frac{EI}{R^4} n^4\right)}{\frac{EI}{R^4} n^2 + \frac{EA}{R^2} n^2 + k_v} + k_w, \quad (7.6)$$

$$P_n = \frac{\frac{EI}{R^4} n^3 + \frac{EA}{R^2} n - \frac{p_0 b}{R} n}{\frac{EI}{R^2} n^2 + \frac{EA}{R^2} n^2 + k_v - \rho A \Omega^2 - \frac{p_0 b}{R}}.$$

Therefore, for each harmonic, $$A_0 = w_0,$$

$$A_n = Q_n a_n - w_0 Q_n' \alpha_n + \Delta_n e_n, \quad (7.7)$$

$$B_n = Q_n b_n - w_0 Q_n' \beta_n + \Delta_n f_n$$

in which $a_n$, $b_n$, $\alpha_n$, $\beta_n$, $e_n$, and $f_n$ are unknown parameters. Parameters $e_n$ and $f_n$ will be referred to hereafter as the mass uneven distribution coefficients, parameters $a_n$ and $b_n$ will be referred to as initial RRO coefficients, and parameters $\alpha_n$ and $\beta_n$ will be referred to as radial stiffness variation coefficients.

At a low speed less than about 180 rotations per minute, we have $$\Delta_n = 0, \ w_0 Q_n' \approx 0. \quad (7.8)$$

Therefore, RRO measurements at a low speed less than about 180 rotations per minute are obtained in step 39 and also decomposed into multiple harmonics in step 40, after which the initial RRO coefficients can be determined by:

$$a_n = \frac{A_n(\Omega = 0)}{Q_n(\Omega = 0)}, \quad (7.9)$$

$$b_n = \frac{B_n(\Omega = 0)}{Q_n(\Omega = 0)},$$

If at any speed, $$w_0 Q_n' \approx 0, \quad (7.10)$$

i.e., the radial stiffness variation has negligible effect on RRO, the mass uneven distribution coefficients $e_n$ and $f_n$ can be easily derived from equations (7.7), $$e_n = \frac{A_n(\Omega) - Q_n(\Omega) a_n}{\Delta_n(\Omega)}, \quad (7.11)$$

$$f_n = \frac{B_n(\Omega) - Q_n(\Omega) b_n}{\Delta_n(\Omega)},$$

If equation (7.10) is not true and the radial stiffness variation does have a recognizable effect on the tire RRO, RRO measurements must be obtained for two high speeds. In such a case, step 42 is effected wherein the tire is rotated at a second high speed and radial run out measurements are obtained. Similar to the first high rotational speed, the second high speed is preferably at least about 600 rpm and may in many cases correspond to between about 1200–1800 rpm (20–30 Hz). In this case, the RRO measurements obtained in steps 38 and 42 can be decomposed into respective multiple harmonics in step 40 by equation (7.1). The following relationships exist for each determined harmonic at the first and second rotating speeds:

$$A_0(\Omega_1) = w_0(\Omega_1),$$

$$A_n(\Omega_1) = Q_n(\Omega_1)a_n - w_0(\Omega_1)Q_n'(\Omega_1)\alpha_n + \Delta_n(\Omega_1)e_n$$

$$B_n(\Omega_1) = Q_n(\Omega_1)b_n - w_0(\Omega_1)Q_n'(\Omega_1)\beta_n + \Delta_n(\Omega_1)f_n \quad (7.12)$$

$$A_0(\Omega_2) = w_0(\Omega_2),$$

$$A_n(\Omega_2) = Q_n(\Omega_2)a_n - w_0(\Omega_2)Q_n'(\Omega_2)\alpha_n + \Delta_n(\Omega_2)e_n$$

$$B_n(\Omega_2) = Q_n(\Omega_2)b_n - w_0(\Omega_2)Q_n'(\Omega_2)\beta_n + \Delta_n(\Omega_2)f_n$$

The radial stiffness variation coefficients $\alpha_n$ and $\beta_n$ and the mass uneven distribution coefficients $e_n$ and $f_n$ can be derived in step 44 from the above equations, $$\alpha_n = \frac{A_n(\Omega_2)\Delta_n(\Omega_1) - A_n(\Omega_1)\Delta_n(\Omega_2) + [Q_n(\Omega_1)\Delta_n(\Omega_2) - Q_n(\Omega_2)\Delta_n(\Omega_1)]a_n}{A_0(\Omega_1)Q_n'(\Omega_1)\Delta_n(\Omega_2) - A_0(\Omega_2)Q_n'(\Omega_2)\Delta_n(\Omega_1)}, \quad (7.13)$$

$$\beta_n = \frac{B_n(\Omega_2)\Delta_n(\Omega_1) - B_n(\Omega_1)\Delta_n(\Omega_2) + [Q_n(\Omega_1)\Delta_n(\Omega_2) - Q_n(\Omega_2)\Delta_n(\Omega_1)]b_n}{A_0(\Omega_1)Q_n'(\Omega_1)\Delta_n(\Omega_2) - A_0(\Omega_2)Q_n'(\Omega_2)\Delta_n(\Omega_1)},$$

$$e_n = \frac{\left\{\begin{array}{l}A_n(\Omega_1)A_1(\Omega_2)Q_n'(\Omega_2) - A_n(\Omega_2)A_0(\Omega_1)Q_n'(\Omega_1) + \\ [Q_n(\Omega_2)A_0(\Omega_1)Q_n'(\Omega_1) - Q_n(\Omega_1)A_0(\Omega_2)Q_n'(\Omega_2)]a_n\end{array}\right\}}{\Delta_n(\Omega_1)A_0(\Omega_2)Q_n'(\Omega_2) - \Delta_n(\Omega_2)A_0(\Omega_1)Q_n'(\Omega_1)},$$

$$f_n = \frac{\left\{\begin{array}{l}B_n(\Omega_1)A_0(\Omega_2)Q_n'(\Omega_2) - B_n(\Omega_2)A_0(\Omega_1)Q_n'(\Omega_1) + \\ [Q_n(\Omega_2)A_0(\Omega_1)Q_n'(\Omega_1) - Q_n(\Omega_1)A_0(\Omega_2)Q_n'(\Omega_2)]b_n\end{array}\right\}}{\Delta_n(\Omega_1)A_0(\Omega_2)Q_n'(\Omega_2) - \Delta_n(\Omega_2)A_0(\Omega_1)Q_n'(\Omega_1)}.$$

In this way, the mass unbalance sizes and locations may be obtained. In the subject analysis, mass unbalance determination actually corresponds to mass uneven distribution. However, point mass determination can also be realized in accordance with such determination since the point mass can be transformed into the uneven distribution form for modeling purposes and can thus be treated in the same way. Normally, if the peaks of several harmonics share the same location, point mass exists in the tire.

Based on the determination in step 44 of any mass unbalance, including the existence of mass uneven distribution and/or point mass(es), the tire can then be evaluated in step 46. An exemplary evaluation process may involve tire sorting based on an established limitation for the amount of mass unbalance in the tire. Such limitation may be dependent on a particular type of tested tire and/or the type of vehicle for which the tire is intended to be used with. If the tire has mass unbalance below the established limitation, then the tire may be sorted into a group that is acceptable for delivering to a customer. If the tire has mass unbalance above the established limitation, the tire may be rejected or returned to manufacturing for subsequent modification. Another exemplary evaluation process corresponds to "grading" the tire into one of a plurality of established categories. Each category may be defined based on certain levels of mass uneven distribution and that affect on a particular type of tire and/or intended type of vehicle, application or location use. It should be appreciated that specific such limitations and grading categories are highly dependent on various parameters as desired by a tire manufacturer and/or customer and thus particular examples of such are not set forth herein.

As a more particular example of the exemplary methodology set forth in FIG. 8, assume that a tire is established in step 34 to have tire parameters as set forth in Table 1. Assume that Equation (7.10) holds true, i.e., the radial stiffness variation has negligible effect on RRO. Tire RRO is then measured in step 38 at a first high exemplary rotation speed of 30 Hz and also measured in step 39 at 0 Hz. Results of the measurement and subsequent harmonic decomposition in step 40 are presented in the following Table 2. Note that the uniform growth part is not listed since it does not affect the subject analysis. It should be appreciated that in alternative embodiments of the presently disclosed technology, uniform growth as it contributes to tire characterization may be considered.

TABLE 2

| | RRO measured at 0 and 30 Hz | | | | | | | | | |
|---|---|---|---|---|---|---|---|---|---|---|
| | N = 1 | n = 2 | n = 3 | n = 4 | n = 5 | n = 6 | N = 7 | n = 8 | N = 9 | n = 10 |
| $\Omega$ = 0 Hz | | | | | | | | | | |
| $A_n$(mm) | 0 | 0.2 | 0 | 0 | 0 | 0 | 0 | 0 | 0 | 0 |
| $B_n$(mm) | 0 | 0 | 0 | 0 | 0 | 0 | 0 | 0 | 0 | 0 |
| $\Omega$ = 30 Hz | | | | | | | | | | |
| $A_n$(mm) | 0 | 0.1431 | 0 | 0.0336 | 0 | −.0170 | 0 | 0.0099 | 0 | −.0064 |
| $B_n$(mm) | 0 | 0 | 0 | 0 | 0 | 0 | 0 | 0 | 0 | 0 |

Although only ten RRO harmonics are provided in Table 2, it should be appreciated that a fewer or greater number of harmonics may be obtained. Substitution of the multiple harmonics of Table 2 into Equations (7.6), (7.9), and (7.11) gives the following mass uneven distribution coefficients in Table 3.

TABLE 3

Mass uneven distribution coefficients derived from RRO

| $\Omega$= 30 Hz | N = 1 | n = 2 | n = 3 | n = 4 | n = 5 | n = 6 | N = 7 | n = 8 | N = 9 | n = 10 |
|---|---|---|---|---|---|---|---|---|---|---|
| $e_n$ | 0 | −.0127 | 0 | 0.0127 | 0 | −.0127 | 0 | 0.0127 | 0 | −.0127 |
| $f_n$ | 0 | 0 | 0 | 0 | 0 | 0 | 0 | 0 | 0 | 0 |

From Table 3 and equation (7.4), mass unbalance can be determined wherein there are two point masses of 20 grams located at $\pi/2$ and $-\pi/2$, respectively. In this way, the mass unbalance is successfully identified. FIGS. 7A through 7D, respectively, illustrate the steps of such mass uneven distribution identification. FIG. 7A provides a two-dimensional illustration of RRO measurement at 0 Hz and FIG. 7B provides a two-dimensional illustration of RRO measurement at 30 Hz. FIG. 7C illustrates the RRO contributed by the initial RRO while FIG. 7D illustrates the RRO contributed by the mass unbalance when the tire is rotated at 30 Hz. Note that the tire deformations graphically represented in FIGS. 7A–7D are enlarged by 200 times for illustrational purposes. In the above figures, the dotted curve represents a perfect circular tire for reference.

Additional aspects of how the subject mass unbalance characterization of a tire may be combined with tire evaluation and related manufacturing processes thereof is depicted in FIG. 10. As previously mentioned, multiple subprocesses 30a–30n, respectively, are performed in construction of a tire 32. Various tire parameters may be established for tire 32 by providing such tire to tire property measurement apparatus 36. Tire property measurement apparatus 36 may sometimes correspond to a plurality of measurement devices for obtaining the respective desired tire parameters. High speed RRO measurements may then be obtained at high speed RRO measurement apparatus 37. As discussed with reference to FIG. 8, when the effects of radial stiffness variation are negligible, RRO measurements are obtained at a low speed less than about 180 rotations per minute and at a first high speed. If the effects of radial stiffness variation are recognizable, then RRO measurements are obtained at a low speed less than about 180 rotations per minute and two different high speeds. The measurements obtained by apparatuses 36 and 37 are relayed to a computer 48, which may correspond to any type of processor, microcontroller or other data analyzer.

Referring still to FIG. 10, a vehicle sensitivity test (VST) 50 is also employed and coupled to computer 48. VST 50 is a measurement assessing vehicle vibrations caused by tire non-uniformity attributes, such as mass unbalance, such as described in additional detail in M. G. Holcombe and R. G. Altman, "A Method for Determining Tire and Wheel Uniformity Needs Using Ride Rating Simulations," SAE 880579, 1998. Normally, high levels of mass unbalance generates high levels of vehicle vibrations making vehicle riding unpleasant. VST 50 can be performed objectively or subjectively. If objectively, the vehicle is instrumented at locations such as the steering wheel, driver's seat, and/or floor of the vehicle so that vibrations can be measured. If subjectively, a professional driver is used to evaluate the severity of the vibration. By doing so, the relationship between vehicle vibration and tire non-uniformity (such as mass unbalance) can be established, from which the limit can be set on tire non-uniformity (such as mass unbalance) so that a good riding can be guaranteed if the tire's non-uniformity level is below the limit. The limit is then programmed directly at computer 48.

After computer 48 calculates the mass uneven distribution coefficients and subsequently determines the size and location of any mass unbalance, such determined parameters can be compared with the limit established by the VST 50 whereby a tire is evaluated, such as by sorting or grading the tire. In accordance with sorting evaluation, if the determined mass unbalance characteristics are below limitations established by VST 50, then a tire may be delivered to a customer. Alternatively, if the determined mass unbalance characteristics are above limitations established by VST 50, then the tire may be rejected or subjected to a modification process. An exemplary modification process corresponds to grinding or adding extra mass to the tire at particular determined locations of mass unbalance in accordance with tire grinding or mass adding processes as are understood by one of skill in the art of tire manufacturing.

Although not illustrated in FIG. 10, it should be appreciated that other evaluation processes such as tire grading into a plurality of different categories may also be effected. Furthermore, the determination of mass unbalance at computer 48 may also be utilized in a feedback modification 52 to improve selected of the various processes 30a–30n, respectively, as are involved in manufacturing of tire 32.

Yet another exemplary embodiment of the presently disclosed technology concerns the prediction and control of high speed uniformity (HSU) based on measurements including high speed RRO measurements. As previously set forth, mass unbalance will generate RRO at high speeds, thus producing undesirable tire spindle forces when the tire is loaded against a flat surface or a road wheel. Therefore, identification of mass unbalance is an important way to predict as well as control high speed uniformity.

Referring now to FIGS. 9 and 11, such figures illustrate exemplary features for characterizing high speed uniformity of a tire. Initially, it should be appreciated that in tire manufacturing, a plurality of different layers are provided to form a tire carcass and summit block. Each of the different layers 1, 2, . . . , n (represented in FIG. 11 as 60a, 60b, . . . , 60n) are combined whereby a portion of overlap or variation introduced by process for that layer may exist as depicted by the respective variations 62a, 62b, . . . , 62n of manufactured tire 64. After a tire is constructed, a plurality of measurements must be established in order to characterize tire high speed uniformity in accordance with the present subject matter.

Referring now to FIG. 9, exemplary steps are illustrated in accordance with a process of manufacturing tires. A first step 70 in such exemplary manufacturing method is to construct a sample set of tires. The measurement of tire properties, including but not limited to tire radius, summit linear mass density, pressure, width, radial stiffness, tangential stiffness, bending stiffness and/or extensional stiffness, are then obtained in step 72 for the sample set of tires. These properties may either be measured with appropriate measurement apparatuses as known to one of ordinary skill in the art, or are provided as predetermined quantities. The measured or provided tire properties from step 72 are utilized in later calculation steps associated with the exemplary manufacturing methodology of FIG. 9. A next step in such methodology corresponds to rotating each tire in the set of sample tires constructed in step 70 at a low speed and measuring radial force variations of the tire. For purposes of the present subject matter, a relatively low speed will be considered to be one less than about 180 rpm (3 Hz). Radial force variations may be obtained by low speed measurement apparatus 66 (see FIG. 11), which may for example correspond to testing apparatus 114 and/or apparatus 132 or others as disclosed in U.S. Pat. No. 5,396,438. Alternative low speed measurement apparatuses, as are well known in the art of tire manufacturing and testing, may also be employed. It should be appreciated that in some embodiments of the present subject matter, all low speed measurements and high speed measurements (including RRO) may be obtained via a single measurement machine if it is designed for this purpose. Other low speed parameters in addition to radial force variations that may be obtained by apparatus 66 may include variations in effective rolling radius, and radial run out measurements.

Referring still to FIG. 9, after low speed measurements are obtained, each sample tire is then rotated in step 76 at a high speed whereby force variations are measured and those measurements are then decomposed into multiple harmonics. Tire radial run out is then measured at multiple speeds in step 78 such that the mass unbalance can be calculated in accordance with the presently disclosed methodology. In subsequent step 80, complex transfer functions may then be determined from the low speed force data, high speed radial run-out data and high speed force variation data. The transfer functions determined in step 80 serve to characterize high speed force variation (HSU) of the set of sample tires. Additional details regarding the statistical method of determination of high speed uniformity are disclosed in U.S. Pat. No. 5,396,438 (Oblizajek), which is incorporated by reference herein for all purposes.

After employing a sample set of tires to obtain measurements and ultimately determine the complex transfer functions utilized for high speed uniformity characterization, a production set of tires is then constructed in step 82. These production tires are then rotated in step 84 at a low speed such that force measurements are measured. The respective production tires are then rotated in step 86 at multiple speeds whereby the radial run-out is measured and mass unbalance can be calculated. High speed uniformity characteristics of each production tire can then be determined in step 88 based on the low speed force measurements taken in step 84, the mass unbalance calculations from step 86, and the complex transfer functions determined in step 80.

After the determination of the production tires' high speed uniformity characteristics in step 88, the tire can then be evaluated in step 90. An exemplary evaluation process may involve sorting and/or grading the tire based on an established limitation of the level of high speed uniformity in the respective production tires. Such limitation may be dependent on the particular type of tested tire and/or the type of vehicle for which the tire is intended to be used with. If the tire's high speed uniformity characteristics are acceptable, then the tire may be sorted into a group for delivering to a customer. If the tire's high speed uniformity characteristics are unacceptable, the tire may be rejected or returned to manufacturing for subsequent modification. Another exemplary evaluation process corresponds to "grading" the tire into one of a plurality of established categories. Each category may be defined based on certain levels of high speed uniformity and the corresponding affect on a particular type of tire and/or intended type of vehicle, application or location use. It should be appreciated that specific such limitations and grading categories are highly dependent on various parameters as desired by a tire manufacturer and/or customer and thus particular examples of such are not set forth herein.

Additional aspects of how the subject high speed uniformity characterization of a tire may be combined with tire evaluation and related manufacturing processes thereof is depicted in FIG. 11. As previously mentioned, multiple layers 60a–60n are arranged with respective overlaps or variations 62a–62n in construction of a tire 64. Low speed force and/or RRO measurements may be obtained via low speed measurement apparatus 66 and high speed RRO measurements may be obtained at high speed RRO measurement apparatus 37. The measurements obtained by apparatuses 37 and 66 are relayed to a computer 48', which may correspond to any type of processor, microcontroller or other data analyzer.

Referring still to FIG. 11, a vehicle sensitivity test (VST) 50' is also employed and coupled to computer 48'. VST 50' may correspond to the same VST measurement 50 as previously described with respect to FIG. 10. Computer 48' then calculates the tire HSU and compares it with the limitation established by the VST 50' such that a tire is evaluated, such as by sorting or grading the tire. In accordance with sorting evaluation, if the determined RRO and HSU characteristics are below limitations established by VST 50', then a tire may be delivered to a customer. Alternatively, if the determined RRO and HSU characteristics are above limitations established by VST 50', then the tire may be rejected or subjected to a modification process. An exemplary modification process corresponds to grinding the tire at particular determined locations in accordance with tire grinding processes as are understood by one of skill in the art of tire manufacturing.

Although not illustrated in FIG. 11, it should be appreciated that other evaluation processes such as tire grading into a plurality of different categories may also be effected. Furthermore, the determination at computer 48' of each layer overlap or variation effect on HSU may also be utilized in a feedback modification 74 to improve the formation of tire 64 by providing optimized locations for each layer's overlap or variation 62a, 62b, . . . , 62n. Such effects may also be utilized in feedback to tire construction process such that new tolerance settings are provided.

Selected combinations of the aforementioned aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function. Similarly, certain process steps may be interchanged or employed in combination with other steps to yield additional exemplary embodiments of tire characterization and manufacturing.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of characterizing mass unbalance in a tire, said method comprising the following steps:
    establishing a plurality of tire parameters for a given tire;
    rotating the given tire at respective first and second rotational speeds and obtaining first and second sets of radial run out measurements;
    decomposing said first and second sets of radial run out measurements into multiple respective harmonics;
    calculating mass uneven distribution coefficients from the decomposed radial run out measurements; and
    determining the size and location of any mass unbalance existent in the given tire.

2. A method as in claim 1, wherein at least one of said first and second rotational speeds corresponds to at least about 600 rotations per minute.

3. A method as in claim 2, wherein one of said first and second rotational speeds corresponds to a low speed less than about 180 rotations per minute.

4. A method as in claim 1, wherein both of said first and second rotational speeds corresponds to at least about 600 rotations per minute, and wherein said first and second rotational speeds are different from one another, and wherein said method further comprises the steps of rotating the given tire at a low speed less than about 180 rotations per minute, obtaining a third set of radial run out measurements, and decomposing the third set of radial run out measurements into multiple respective harmonics.

5. A method as in claim 4, further comprising the steps of:
    calculating radial stiffness variation coefficients from the decomposed radial run out measurements; and
    determining the size and location of any radial stiffness variation existent in the given tire.

6. A method as in claim 1, wherein the plurality of tire parameters in said establishing step are selected from the group consisting of tire radius, tire mass, tire inflation pressure, tire width, tire radial stiffness, tire tangential stiffness, tire bending stiffness and tire extensional stiffness.

7. A method as in claim 1, wherein said step of determining the size and location of any mass unbalance existent in the tire includes determination of any mass uneven distribution and point masses existent in the provided tire.

8. A method as in claim 1, further comprising a step after said determining step of grading or sorting the given tire into one of at least two categories established by predetermined mass unbalance limitations.

9. A method of characterizing high speed uniformity of a tire, said method comprising the following steps:
    providing a manufactured tire characterized by a plurality of layers;
    rotating the manufactured tire at a first predetermined rotational speed and obtaining at least one first force measurement;
    rotating the manufactured tire at a second predetermined rotational speed and obtaining at least one radial run out measurement; and
    determining from said at least one first force measurement and said at least one radial run out measurement the effect of layer overlap or variation for each of the plurality of layers in the manufactured tire on the overall tire high speed uniformity.

10. A method as in claim 9, wherein said second predetermined rotational speed corresponds to at least about 600 rotations per minute.

11. A method as in claim 9, wherein said first rotational speed corresponds to less than about 180 rotations per minute.

12. A method as in claim 9, wherein said at least one first force measurement is selected from the group consisting of effective rolling radius, radial force, and radial run out.

13. A method as in claim 9, further comprising the steps of:
    rotating the given tire at a third predetermined rotational speed and obtaining at least one second force measurement, wherein said third predetermined rotational speed corresponds to at least about 600 rotations per minute; and
    decomposing the at least one second force measurement into multiple harmonics.

14. A method as in claim 13, further comprising the step of determining complex transfer functions from said at least one first and second force measurements, and said at least one radial run out measurement, and wherein said step of determining layer overlap or variation also takes into account such complex transfer functions.

15. A method as in claim 14, further comprising a step of determining tire high speed uniformity characteristics for the given tire from the at least one first force measurement, the at least one radial run out measurement, and the complex transfer functions.

16. A method as in claim 9, further comprising the step of grading or sorting the given tire into one of at least two categories established by predetermined high speed uniformity limitations.

17. A method of manufacturing tires, comprising the following steps:
    constructing at least one tire;
    establishing a plurality of tire parameters for said at least one tire;
    obtaining radial run out measurements for said at least one tire for at least one predetermined rotational speed;
    calculating parameters for any mass unbalance existing in said at least one tire;
    performing a comparison of the mass unbalance calculations to established mass unbalance limitations; and
    controlling manufacture of subsequent tires responsive to the comparison in said performing step.

18. A method as in claim 17, wherein the plurality of tire parameters in said establishing step are selected from the group consisting of tire radius, tire mass, tire inflation pressure, tire width, tire radial stiffness, tire tangential stiffness, tire bending stiffness, and tire extensional stiffness.

19. A method as in claim 17, wherein radial run out measurements are obtained at a low speed less than about 180 rotations per minute and at a first predetermined rotational speed of at least about 600 rotations per minute.

20. A method as in claim 17, wherein radial run out measurements are obtained at a low speed less than about 180 rotations per minute and at first and second different predetermined rotational speeds each characterized by a rotational speed of at least about 600 rotations per minute.

21. A method as in claim 17, wherein said step of calculating any mass unbalance existing in said at least one tire comprises the steps of:
   decomposing radial run out measurements from said obtaining step into multiple respective harmonics;
   calculating mass uneven distribution coefficients for multiple harmonics; and
   determining from said mass uneven distribution coefficients the size and location of any mass unbalance existent in said at least one tire.

22. A method as in claim 21, wherein said step of determining the size and location of any mass unbalance existent in the at least one tire includes determination of any mass uneven distribution and point masses existent in the provided tire.

23. A method as in claim 17, wherein the mass unbalance limitations of said performing step are established by a vehicle sensitivity test.

24. A method as in claim 17, further comprising the step of grinding or adding extra mass to the at least one tire to reduce levels of mass unbalance identified in the at least one tire.

25. A method of manufacturing tires, comprising the following steps:
   establishing complex transfer functions associated with tire characterization;
   constructing a set of production tires;
   rotating each production tire at a first predetermined rotational speed and obtaining at least one first force measurement;
   rotating each production tire at at least second and third rotational speeds, obtaining at least one radial run out measurement at each of the at least second and third rotational speeds, and calculating any mass unbalance associated with each production tire;
   calculating high speed uniformity characteristics of each production tire based on said at least one first force measurement, the complex transfer functions from said establishing step, and the calculated mass unbalance; and
   controlling manufacture of subsequent tires responsive to the high speed uniformity characteristics in said calculating step.

26. A method as in claim 25, further comprising the step of establishing a plurality of tire parameters for said set of production tires, wherein said plurality of tire parameters are utilized in calculation of the mass unbalance for each production tire.

27. A method as in claim 26, wherein the plurality of tire parameters in said establishing step are selected from the group consisting of tire radius, tire mass, tire inflation pressure, tire width, tire radial stiffness, tire tangential stiffness, tire bending stiffness, and tire extensional stiffness.

28. A method as in claim 25, wherein said first rotational speed is less than 180 rotations per minute and wherein said second and third rotational speeds are at least about 600 rotations per minute.

29. A method as in claim 25, wherein said method of manufacturing tires further comprises the step of obtaining at least one radial run out measurement at a low speed less than about 180 rotations per minute for contributing to the mass unbalance calculation of each production tire.

30. A method as in claim 25, wherein said step of controlling manufacture of subsequent tires comprises providing tolerance settings and predetermined locations for each layer overlap or variation in the subsequent tires.

31. A method as in claim 25, further comprising the step of performing a comparison of the high speed uniformity characteristics from said calculating step to established high speed uniformity limitations.

32. A method as in claim 31, wherein the high speed uniformity limitations of said performing step are established by a vehicle sensitivity test.

33. A method as in claim 25, further comprising the step of grinding or adding extra mass to the respective production tires to improve high speed uniformity characteristics calculated for each production tire.

34. A method as in claim 25, wherein said step of establishing complex transfer functions comprises:
   constructing a set of sample tires;
   rotating each sample tire at said first predetermined rotational speed and obtaining at least one first sample tire force measurement;
   rotating each sample tire at said second predetermined rotational speed and obtaining at least one second sample tire force measurement;
   rotating each sample tire at at least said second and third rotational speeds and obtaining at least one radial run out measurement at each of the at least said second and third rotational speeds; and
   determining complex transfer functions from the at least one first force measurement, the at least one second force measurement, and the radial run out measurements obtained at the at least second and third rotational speeds.

35. A method as in claim 34, further comprising the steps of calculating any mass unbalance associated with each sample tire, and wherein said step of determining complex transfer functions takes into account the calculated mass unbalance.

36. A method as in claim 34, further comprising the step of decomposing the at least one fifth force measurement into multiple harmonics.

* * * * *